April 4, 1967
D. R. HARTDEGEN
3,312,486
DEVICE FOR CLAMPING AND LOOSENING TAPERED
TWIN KEY SHAFT CLAMPS
Filed April 5, 1965
2 Sheets-Sheet 2
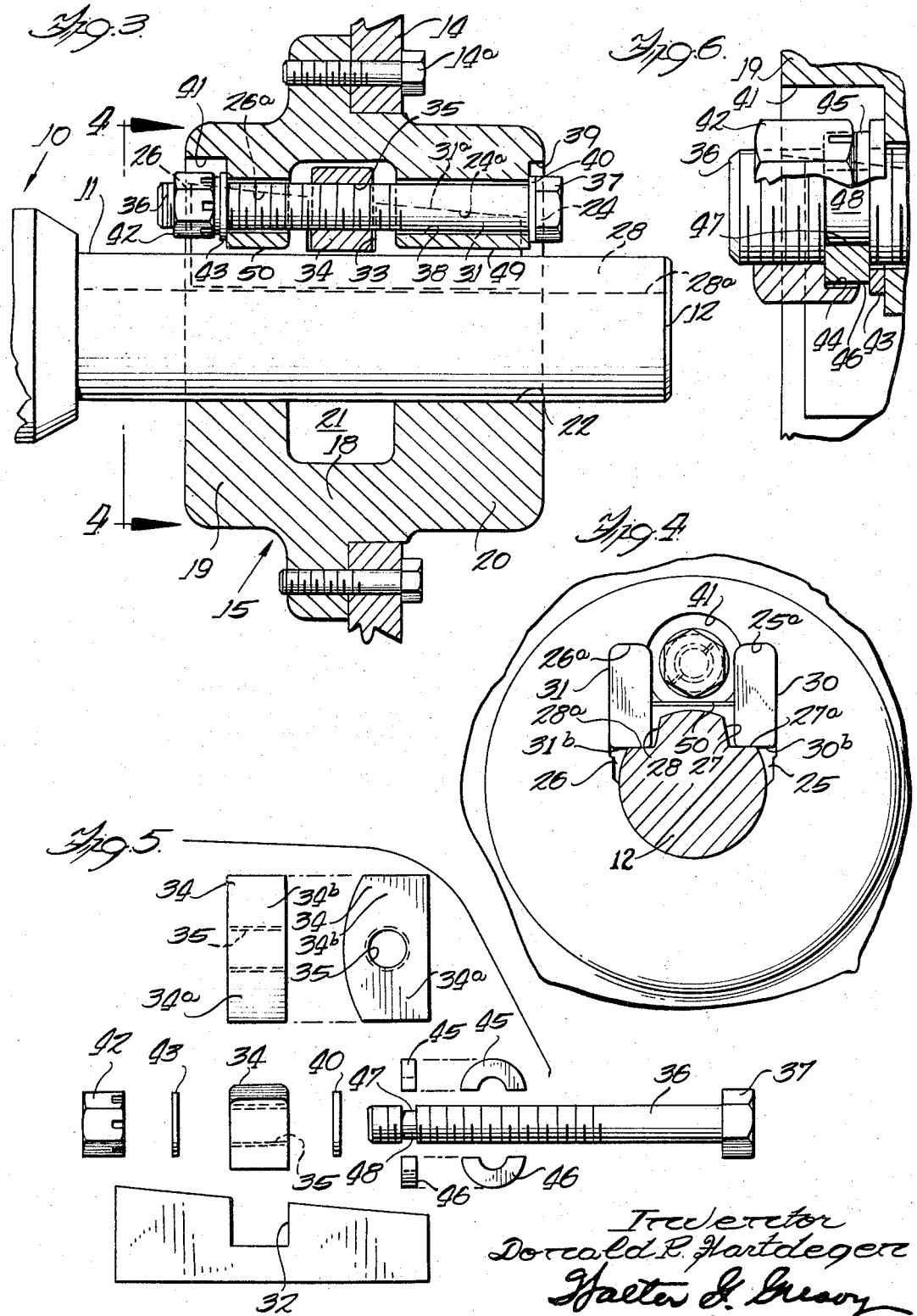
Inventor
Donald R. Hartdegen
Walter G. Gregory
Attorney

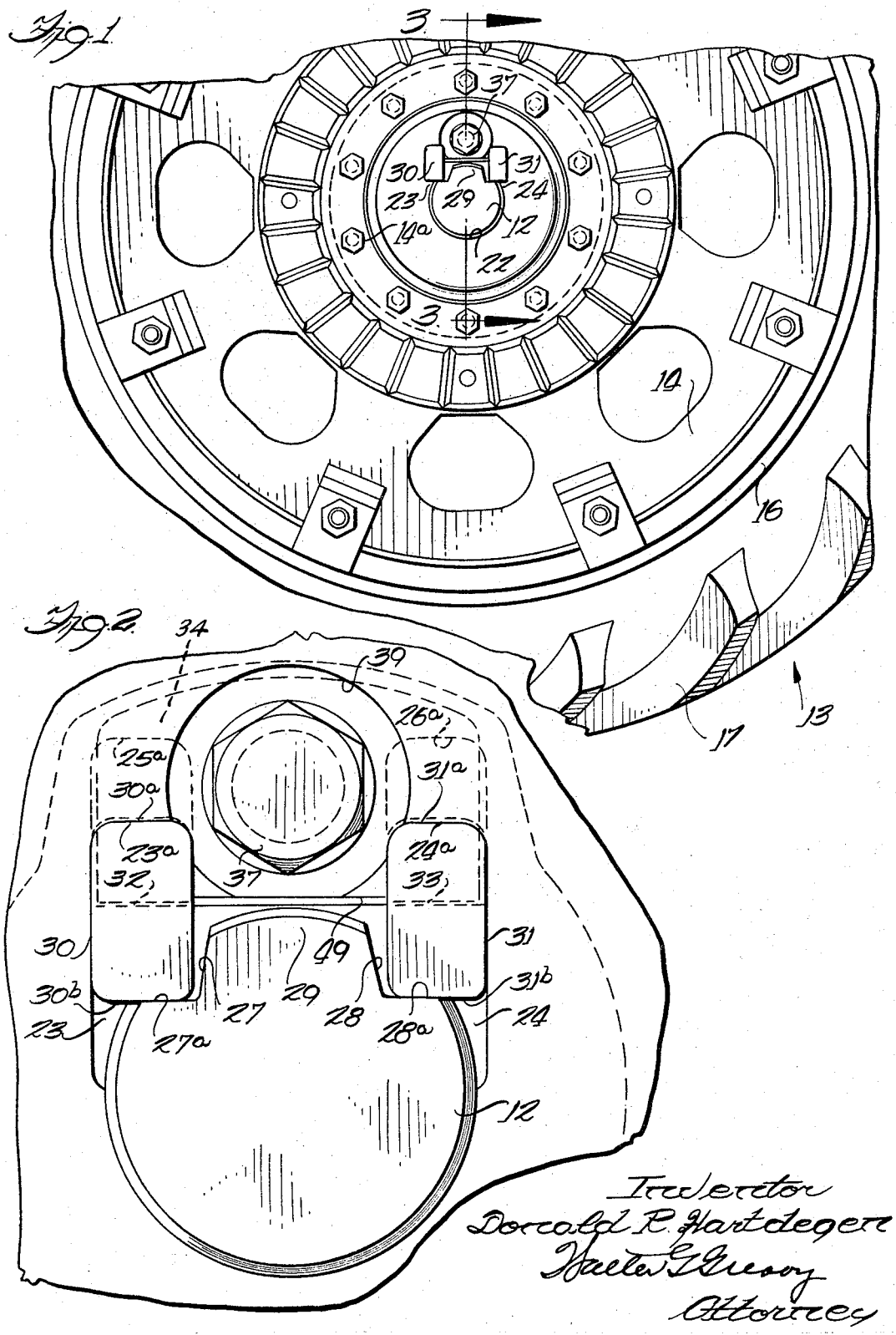

United States Patent Office 3,312,486
Patented Apr. 4, 1967

3,312,486
DEVICE FOR CLAMPING AND LOOSENING TAPERED TWIN KEY SHAFT CLAMPS
Donald R. Hartdegen, Lockport, Ill., assignor to International Harvester Company, Chicago, Ill., a corporation of Delaware
Filed Apr. 5, 1965, Ser. No. 445,621
7 Claims. (Cl. 287—52.05)

This invention relates to mounting mechanisms of the type wherein one member is mounted on another member and torque is transmittable therebetween. More particularly, it is concerned with a wheel mounting mechanism that is capable of transmitting torque from an axle shaft to a drive wheel while simultaneously providing a means for fixedly positioning the wheel at any one of a number of preselected axially disposed locations and which is readily adaptable to agricultural tractor vehicles.

Heretofore many such mounting devices have been proposed but because of their complexity or their inability to transmit large reversible torque loads, without causing damage to some of the associated elements, such prior devices have not been altogether satisfactory.

The primary object of this invention therefore, is to provide a simplified and improved easily adjustable mounting means for transmitting large torque loads from one element to another element mounted thereon without imposing additional loads upon the associated tightening members.

Another object is to provide a wheel mounting means fashioned in the form of a drive mechanism that includes means adjustably wedging tapered camming elements between opposed flat surfaces on a drive axle and in a drive wheel mounted on the axle.

A further object is to provide means for transmitting torque between a drive axle and a wheel mounted thereon which includes a plurality of circumferentially spaced tapered members adjustably wedgeable between opposed flat surfaces on the axle and hub of the wheel and having adjustable means operable from one side of the wheel for tightening and loosening said tapered members into and out of a tight fitting contact relationship with the opposed cooperating flat surfaces.

The foregoing and other objects and features of the invention will become apparent as the disclosure is more fully made in the following detailed description of a preferred embodiment of the invention as illustrated in the accompanying sheets of drawings in which:

FIGURE 1 is an elevational view of a vehicle drive wheel with a drive wheel mounting utilizing one preferred embodiment of the present invention therein;

FIGURE 2 is an elevational view similar to FIGURE 1 but somewhat more fragmentary and shown on an enlarged scale;

FIGURE 3 is a fragmentary vertical sectional view taken generally along the line 3—3 of FIGURE 1 looking in the direction of the arrows thereof and shown on an enlarged scale;

FIGURE 4 is a view similar to FIGURE 2 taken on the line 4—4 of FIGURE 3;

FIGURE 5 is an exploded-type view showing the individual components of the means for adjusting the camming elements; and FIGURE 6 is a fragmentary sectional view, shown on an enlarged scale, of the bolt fastening and interlocking device.

Referring now to the drawings it will be seen a rear axle housing of an agricultural tractor, indicated generally by the reference numeral 10, has a drive axle 11 extending therethrough with an end portion 12 projecting outwardly therefrom.

A tractor wheel, indicated in its entirety by the reference numeral 13, includes a central flange or web structure 14 to which is suitably affixed as by the bolts 14a a central hub member such as 15. A tire rim 16 mounted peripherally on said web structure accommodates a pneumatic tire 17 mounted thereon in conventional manner.

The hub 15 is fashioned with a central body portion 18 that interconnects spaced inner and outer wall portions 19, 20 and, as arranged, provides an interior chamber or cavity 21 therebetween. The inner and outer wall portions 19, 20 of said hub are provided with coaxial openings that form a bore 22 extending axially therethrough and dimensioned to snugly receive the axle end portion 12. A pair of axially extending recesses 23, 24 in outer wall 20 are coaxially aligned respectively with a pair of recesses 25, 26 in inner wall 19. Aligned recesses 23, 25 are disposed to one side of the axial or a diametral center line of bore 22 while the other aligned recesses 24, 26 are disposed on the opposite side of said center line. The upper surfaces 23a, 24a, 25a and 26a of the respective recesses are formed at an angle to the longitudinal axis of the bore 22 and slope from one surface or face of the hub downwardly toward the opposite surface or face of the hub, the slope of the recess surfaces 23a and 25a representing a projection of one another as are also 24a and 26a a projection of one another. As thus arranged one tapered element may contiguously engage the slopingly aligned surfaces 23a and 25a while another such tapered element may so engage the aligned surfaces 24a and 26a.

The axle end portion 12 is fashioned to provide a pair of longitudinally extending recesses or notches 27, 28 with a tongue-like portion 29 of the axle therebetween. The horizontal surfaces 27a, 28a of the respectively associated notches are each finished to provide what is frequently termed a "flat."

A pair of camming members, wedges or keys 30, 31 are fashioned with one surface 30a, 31a of each tapered or sloping in the longitudinal dimension at an angle that corresponds to the slope of the complemental surfaces 23a, 25a and 24a, 26a which they will engage when mated therewith. The opposite surfaces 30b and 31b of said camming or wedging members are flat and parallel with the axis of bore 2. The angle of the slope of the taper on camming members 30, 31 may vary according to designers choice but in the illustrated embodiment this is shown as approximating 5° but the invention should not be construed as being limited to this specific degree of taper.

Camming members 30, 31 are provided with respective detent notches or recesses 32, 33 that are dimensioned to loosely receive a cross-block or pusher member 34 in turn dimensioned and formed for slidable positioning within cavity 21 and restricted from rotation by bottom surfaces in contact with said camming members 30, 31. A threaded bore 35 in cross-block 34 is adapted to threadably receive the threaded shank of a bolt 36 having a head 37 on one end thereof. Coaxially aligned openings in inner and outer wall portions 19, 20 of hub 15 provide a bore 38 extending therethrough that rotatably accommodates bolt 36 therein.

A recess 39 adjacent bore 38 in the outer surface of wall 20 of hub 15 may be provided to accommodate in a slightly countersunk fashion the head 37 of bolt 36 and a spacer or washer 40 may be positioned between said head and the inner surface of said recess. A somewhat deeper recess 41 adjacent the opposite end of bore 38 in the outer surface of wall 19 of hub 15 is provided to accommodate in a countersunk fashion a nut 42 threaded onto the free end of bolt 36 and a spacer or washer 43 may be inserted between said nut and the inner surface of the latter recess.

Nut 42 (FIG. 6) is provided with a counter-bore or recess 44 which extends axially inwardly from one surface thereof and is dimensioned to accommodate in removable fashion therefrom a pair of split collars 45, 46. Said collars being positionable in an annular groove or recess 47 in bolt 36 extending radially outwardly therefrom and are received in the recess or counter bore 44 of nut 42.

In assembling the proposed mechanism, bolt 36 is first inserted through bore 38 in outer wall member 20 then threaded through the pusher or cross-block member 34 after which it is passed through the bore 38 in inner wall member 19. Next the optional washer 43, split collars 45, 46 are positioned in annular groove 47 and around the reduced diameter portion 48 of bolt 36 after which the nut 42 is threaded onto said bolt to receive said collars into the recess or counterbore 44. Said nut may then be tightened sufficiently to closely position collars 45, 46 against a side wall of annular groove 47 but having dimensional clearance to face surface of counterbore 41, whereupon turning of the head 37 of bolt 36 will then operate to turn nut 42 and said collars as a unit while at the same time the pusher block or key moving means 34 travels along bolt 36 and through cavity 21. The key members or cams 30, 31 are subsequently positioned in their respective recesses 23, 25 and 24, 26 and disposed so that the opposite end portions 34a, 34b of pusher block 34 are received in the respective detent notches 32, 33 in said key members. The wheel assembly may now be positioned over the axle end portion 12 with the key members 30, 31 being slidably positioned in the respective recesses 27, 28 of said axle. When the wheel assembly has been properly located axially of the associated axle the bolt head 37 is thereafter adjusted, thereby causing the wedge moving means or pusher block 34 to move the keys or wedges 30, 31 axially into engagement with the cooperating surfaces of the axle and attached hub. It will be seen therefore that this action has the effect of forcing the camming members or keys into a tight drive transmitting and clamping relation between the axle and the associated wheel hub whereby torque is transmittable therebetween.

To disengage the camming members from their tight drive transmitting relation the adjusting bolt 36 is turned in a direction opposite that for tightening whereupon the pusher block 34 travels axially in an opposite or backing-off direction to relieve the tight fit of said cam members. This provides a positive means of loosening the keys without use of a hammer or other loosening tool.

The hub portion remaining between recesses 23, 24 and between recesses 25, 26 after the respective recesses have been fashioned therein provide respective tongue-like pads having axially extending surfaces 49, 50 that may, if desired, be conformed to the curvature of the axle 12 but may also be flat if so desired. In either event these pad surfaces are slightly spaced radially from the axle 12 when the wheel is in its tightly clamped position. Preferably, each of the recesses 23, 24, 25, 26 have a portion thereof that extends a short distance beyond or to one side of an axial center line of bore 22 to enable said bore to snugly receive axle end portion 12 and still permit axial adjustment or displacement by rocking of hub wheel assembly 13 on pad surfaces 49, 50 when the camming elements are slightly loosened or withdrawn. Thus the pad surfaces 49, 50 also provide a stop for the wheel so the camming members need only be loosened until said surfaces contact and carry the weight of the wheel on the axle after which the wheel may be rocked through a small angle, in a vertical plane through the axle, on the axle and the pad surfaces to move it to a different or axially displaced position for changing the tread spacing of the wheels.

It should now be apparent that a novel adjustable wheel mounting means has been shown and described. A means wherein the camming elements are loaded in compression while the adjusting means comprises a single bolt turnable for tightening and loosening the camming keys, and wherein said bolt is not loaded as torque is transmitted through the shaft. Furthermore, it presents the advantage of being able to both tighten and loosen the camming keys from the same side of the wheel hub while, additionally, all components are included within the hub of the wheel. It is to be understood that changes may be made in the disclosed construction without departing from the spirit of the invention or the scope thereof as defined in the appended claims.

What is claimed is:

1. In combination with a tractor drive axle having a hub receiving end portion and a tractor drive wheel having wheel structure provided with a central hub, means providing a driving connection between said axle and said wheel, comprising; means formed in said hub providing a plurality of recesses disposed one on each side of a diametral center line of said hub and axially extending between opposite faces of said hub and having a surface in each recess inclined relative to the axle, said hub having an axial bore extending therethrough receiving said axle therein and intersecting said recesses throughout the length thereof; said axle having a plurality of axially extending recesses therein disposed one on each side of a diametral center line of said axle; a plurality of elongated cam members tapered along one dimension of the longitudinal axial length thereof and disposed one each between a recess of said hub and a recess of said axle; adjusting means mounted in said hub including cam pusher means extending transversely of said shaft between and engageably connected with each of said cam members, and screw thread means constrained against axial displacement within said hub and axially extending therethrough and threadably connected to said pusher means and being rotatably operable for slidably urging said plurality of cam members into and out of a tight drive transmitting relation between said axle and said hub.

2. A wheel and axle assembly comprising: an axle having an outwardly extending end portion; a wheel having a hub with said hub having spaced outboard and inboard wall portions with central coaxial bores extending therethrough and snugly receiving the axle; means formed in the wall portions of said hub providing a first set of two coaxial recesses extending inwardly one each from an opposite side of said hub and having a wall surface in each recess inclined relative to the axle, and a second set of two coaxial recesses extending axially inwardly one each from an opposite side of said hub and having a wall surface in each recess inclined relative to the axle, with said first and second sets of recesses being spaced from and disposed one set on each side of a diametral center line of said hub; means forming a plurality of peripherally spaced and axially extending recesses in said axle; drive transmitting means interposed between said hub recesses and said axle recesses including first and second elongated key members tapered in one dimension only along the longitudinal axis of each key member and disposed with one each of said members in said first set of coaxial recesses and another one of said members in said second set of coaxial recesses, with said key members extending into respective ones of the axially extending recesses in said axle; means providing a cross-block disposed in said hub between said outboard and inboard wall portions and extending between said key members and constrained for slidable movement therewith; adjusting means including a screw thread member mounted for rotation in said hub and threadably connected to said cross-block and operable for slidably urging said key members into and out of a tight drive transmitting relation betwen said axle and said hub.

3. The mechanism described in claim 2 and further characterized in that said key members are provided with transverse notches intermediate the ends thereof adapted to receive opposite ends of said cross-block.

4. The invention described in claim 3 and further characterized in that the axis of said screw thread member is disposed so as to substantially intercept a diametral center line of said hub extending between peripherally spaced said first and second sets of coaxial recesses.

5. A wheel and axle assembly comprising: an axle having an outwardly extending end portion; a wheel having a hub with said hub having spaced outboard and inboard wall portions with central coaxial bores extending therethrough and snugly receiving the axle; means formed in the wall portions of said hub providing a first set of two coaxial recesses extending inwardly one each from an opposite side of said hub and having a wall surface in each recess inclined relative to the axle, and a second set of two coaxial recesses extending axially inwardly one each from an opposite side of said hub and having a wall surface in each recess inclined relative to the axle, with said first and second sets of recesses being spaced from and disposed one set on each side of a diametral center line of said hub; means forming a plurality of peripherally spaced and axially extending recesses in said axle; drive transmitting means interposed between said hub recesses and said axle recesses including first and second elongated wedge members tapered along one dimension of the longitudinal axial length thereof and disposed with one each of said members in said first set of coaxial recesses and another one of said members in said second set of coaxial recesses and extending into respective ones of the axially extending recesses in said axle; wedge moving means disposed in said hub between said outboard and inboard wall portions including a cross-block member extending between said wedge members, and means constraining said cross-block member for slidable movement with said wedge members; adjusting means including an axially extending screw thread member mounted for rotation in said hub, means threadably connecting said latter member to said cross-block member, and releasably interlocking means operative to permit rotation of said screw thread member while preventing axial displacement thereof, and having said adjusting means operable for slidably moving said wedge members into and out of a tight wedge interlock relation between said axle and said hub.

6. The invention described in claim 5 but further characterized in that said adjusting means includes a bolt head projecting outwardly from one side of said wheel whereby said adjusting means is made operatively accessible from only one side of said wheel for slidably urging said wedge members into and out of a tight wedge interlock relation between said axle and said hub.

7. The invention described in claim 6 but further characterized in that said releasably interlocking means includes separable abutting members carried by said screw thread member and constrained against axial displacement relative to said latter member, and nut fastening means threadably receivable on said screw thread member and having a recess therein adapted to accommodate said abutting members when said nut means is threadably moved into tight fitting relation thereagainst.

References Cited by the Examiner

UNITED STATES PATENTS

| 732,738 | 7/1903 | Hammen | 287—53 |
| 982,403 | 1/1911 | Whitton. | |
| 2,005,828 | 6/1935 | Parker. | |

FOREIGN PATENTS 162,467   3/1949   Austria.

A. HARRY LEVY, *Primary Examiner.*